(12) United States Patent
Livingstone et al.

(10) Patent No.: US 6,454,834 B1
(45) Date of Patent: Sep. 24, 2002

(54) REGENERABLE AIR CLEANING DEVICE

(75) Inventors: David E. Livingstone, Harrietsville (CA); Michael R. Harms, Mendota Heights, MN (US); Daniel T. Chen, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/630,674

(22) Filed: Aug. 1, 2000

(51) Int. Cl.[7] ............................. B01D 53/02; B01D 29/62
(52) U.S. Cl. ..................... 95/11; 95/21; 95/22; 95/26; 95/148; 96/111; 96/114; 96/115; 96/143; 96/147; 96/417; 96/425; 55/467; 55/385.3
(58) Field of Search ................................. 95/11, 12, 20, 95/21, 22, 26, 148, 901; 55/467, 385.3, 486; 96/111, 113, 114, 115, 134, 143, 147, 417, 421, 424, 425, FOR 167, FOR 168, FOR 170

(56) References Cited

U.S. PATENT DOCUMENTS

| | | | | |
|---|---|---|---|---|
| 4,181,513 A | * | 1/1980 | Fukuda et al. | 55/486 |
| 4,925,468 A | * | 5/1990 | Kishi et al. | 55/467 |
| 5,827,355 A | | 10/1998 | Wilson et al. | 95/114 |
| 5,912,423 A | * | 6/1999 | Doughty et al. | 95/107 |
| 5,980,612 A | * | 11/1999 | Kelly | 95/106 |

FOREIGN PATENT DOCUMENTS

| | | | | |
|---|---|---|---|---|
| DE | 3517105 | 11/1985 | ......... | B01D/53/06 |
| DE | 4104513 | 8/1991 | ......... | B01J/20/20 |
| DE | 19805011 | 8/1999 | ......... | B01D/53/04 |
| DE | 19838996 | 2/2000 | | |
| FR | 2744375 | 8/1997 | ......... | B01J/20/34 |
| JP | 60-238122 A | * 11/1985 | ......... | 96/140 |
| JP | 01210018 | 8/1989 | | |
| JP | 055184838 | 7/1993 | | |
| JP | 09313853 | 12/1997 | | |
| JP | 2000079311 | 3/2000 | | |

* cited by examiner

Primary Examiner—Robert A. Hopkins
(74) Attorney, Agent, or Firm—Gary L. Griswold; Robert W. Sprague; William J. Bond

(57) ABSTRACT

A regenerable air cleaning device is disclosed which comprises a filter holder supporting a regenerable filter that includes activated carbon fibers (ACF) and a control system that is adapted to determine when to regenerate the regenerable filter. The device exhibits high performance and longevity over many regeneration cycles.

41 Claims, 16 Drawing Sheets

REGENERABLE AIR CLEANING DEVICE

FIELD OF THE INVENTION

This invention relates to air cleaning, particularly involving a regenerable air cleaning device.

BACKGROUND OF THE INVENTION

Confined areas that are subject to build-up of air-borne pollutants such as organic solvents or cigarette smoke can cause negative effects on the health of a person spending significant time in such an area. Cleaning of the air in the confined space, by filtration, absorption or adsorption of pollutants, reduces the possibility of these potentially negative effects being induced. However, the capacity of a filter or adsorbent diminishes as a result of use and ultimately saturation occurs. As a result, frequent replacement of saturated filters is necessary. This is inconvenient and costly. In addition, if a filter is integrated into ducting systems that move air into, out of or within a confined space, regular replacement of the integrated filter can be impractical.

French Patent Application No. 2,744,375 describes an activated charcoal filter integrated into ducting of a heating, ventilation and cooling (HVAC) system of an automobile. The activated charcoal filter is regenerated in situ by heat-induced desorption of adsorbed molecules. A fan then blows away the desorbed molecules. Thus, when the automobile's electrical system is switched on, a control system automatically adjusts valves in the HVAC system to permit flow of air from outside the vehicle through the filter and again to the outside of the vehicle. A heat source, either integral with or in close proximity to the filter, is heated and the blowing fan is activated to cause air to flow through or over the filter to the outside of the vehicle. Heat causes material adsorbed on the filter to be released and the flow of air carries the released material to the outside of the vehicle. This sequence of events occurs for a predetermined time, regardless of the actual degree of contamination of the filter. It happens every time that the vehicle engine is started, and is not affected by the duration over which the engine is kept running. Hence the frequency and extent of regeneration are not related to the actual state of the filter, nor to the period of time over which the filter has been active.

Heating of the filter for regeneration puts additional strain on, and may necessitate additional capacity in, the automobile's electrical system. The cooling effect of the blower, in operation to exhaust the desorbed molecules, puts a further demand on the electrical system to maintain a suitable regeneration temperature in the filter. This problem is particularly pronounced in the cold winters experienced in North America. Furthermore, during the predetermined regeneration time, the HVAC system is unable to perform its intended function of heating or cooling and ventilating. This is undesirable, especially in extreme weather conditions.

The filter of French Patent Application No. 2,744,375 is an integral part of an HVAC system of an automobile. It is not portable, and does not lend itself to retrofitting of existing automobiles that do not have such a filter as part of their HVAC systems. Retrofitting of existing vehicles would require significant labour and expense. This would be cost-prohibitive for many consumers.

U.S. Pat. No. 5,827,355 describes a regenerable carbon fiber composite filter. The composite material is rigid and comprises carbon fibers and a binder, such as powdered phenolic resin. The presence of the binder and the generally porous structure of the rigid filter result in a high current (1–20 amps) being required to heat the filter for regeneration purposes. The current flow is parallel to the pleats. Such an arrangement makes good electrical contact at the edge of the pleats difficult. The current flow, and hence heating of the filter, is expected to be uneven throughout the rigid structure due to the porosity of the structure and also due to the presence of the binder which can create regions of high resistance and consequent hot spots during regeneration.

Also disclosed in U.S. Pat. No. 5,827,355 is an air conditioner that includes the rigid composite air filter. The air conditioner is designed for mounting in a wall and connection to outside air. Positioning of a movable damper selects either fresh outside air or recirculated air from the interior of the room, or both. A first blower is provided to pass air to be treated over the filter and into the room. When in regeneration mode, the filter is heated and the damper is positioned to direct air, moved by a second blower over the heated filter, through an exhaust outlet. As discussed above, blowing air during regeneration is not desired due to the cooling effect of air movement. The device of U.S. Pat. No. 5,827,355, having two blowers and a moving damper providing multiple air paths, is cumbersome and will be more prone to mechanical failure than a device having fewer such parts.

SUMMARY OF THE INVENTION

What has not been appreciated until now, with respect to activated carbon filters, is the critical effect that an integrated system for controlling cycles of filtering and regeneration of activated carbon has on the performance and longevity of such filters.

In one aspect, the present invention provides a regenerable air cleaning device comprising:
  a filter holder supporting a regenerable filter that includes activated carbon fibers (ACF); and
  a control system that is adapted to determine when to regenerate the regenerable filter.

The device is preferably a regenerable air cleaning device wherein the filter holder and filter are integral and non-demountable and the device further comprises a heat source for regenerating the regenerable filter, although also considered is a regenerable air cleaning device in which the filter holder and filter are demountable so that the filter can be removed for regeneration by a heat source and then remounted.

The device can further comprise:
  a housing having an air inlet port and an air outlet port in communication to provide a passage for air to pass through the housing, the filter being situated in the passage; and
  a fan situated in the passage to draw air through the housing;
  whereby, in operation, the filter removes contaminants from air drawn through the housing.

In another aspect, the present invention provides a method of cleaning air in a confined space, comprising operating the regenerable air cleaning device disclosed herein in the confined space.

An advantage of the filter/control system combination of the present invention is that the filter exhibits high performance and longevity over many regeneration cycles, in some instances more than 50. The life of the filter will be equal to, or greater than, the life of the other components of the device.

In its simplest embodiment, the filter/control system combination of the present invention can be adapted for use, for example, in a range hood over a cooking stove. Such an embodiment would require only a filter in a filter holder and an integrated control system, with each being adapted for connection to a suitable power supply.

The present invention also provides an air cleaning device that comprises the filter/control system combination and that can be stand-alone. It can operate independently of, or integrated within, an HVAC system, such as found in automobiles and other vehicles such as an aircraft, boat and the like. It may also be used in non-vehicular applications, for instance, cleaning the air in places such as a restaurant, commercial kitchen, clean room, operating theatre, laboratory, house, garage, factory, rest room or office.

More generally, it may be used in any residential, commercial or other building that may be subjected to build-up of vapours, gases or odours produced, for example, directly or indirectly by human or animal occupants (e.g. cigarette smoke, paints and coatings odours, etc.).

A stand-alone device of the invention containing the filter/control system combination can be sized for portability and for various applications, including placement within a confined space such as the cabin of a motor vehicle. A device of the invention that is designed for an automobile can be powered by the vehicle's 12V power port (lighter socket) or a 12V AC adapter. In such a configuration, it can operate simultaneously with the vehicle's HVAC system. Such a device can be simple in construction, having a single blower or fan and one air passage, with no need for moving parts such as dampers or valves. It has low power requirements and does not put significant extra load on the electrical system of a vehicle. Consequently, no additional capacity in, or modification to, the electrical system is required.

BRIEF DESCRIPTION OF THE FIGURES

The invention is further illustrated in the accompanying drawings showing, by way of example, some embodiments of the invention, of which.

Figure 1:
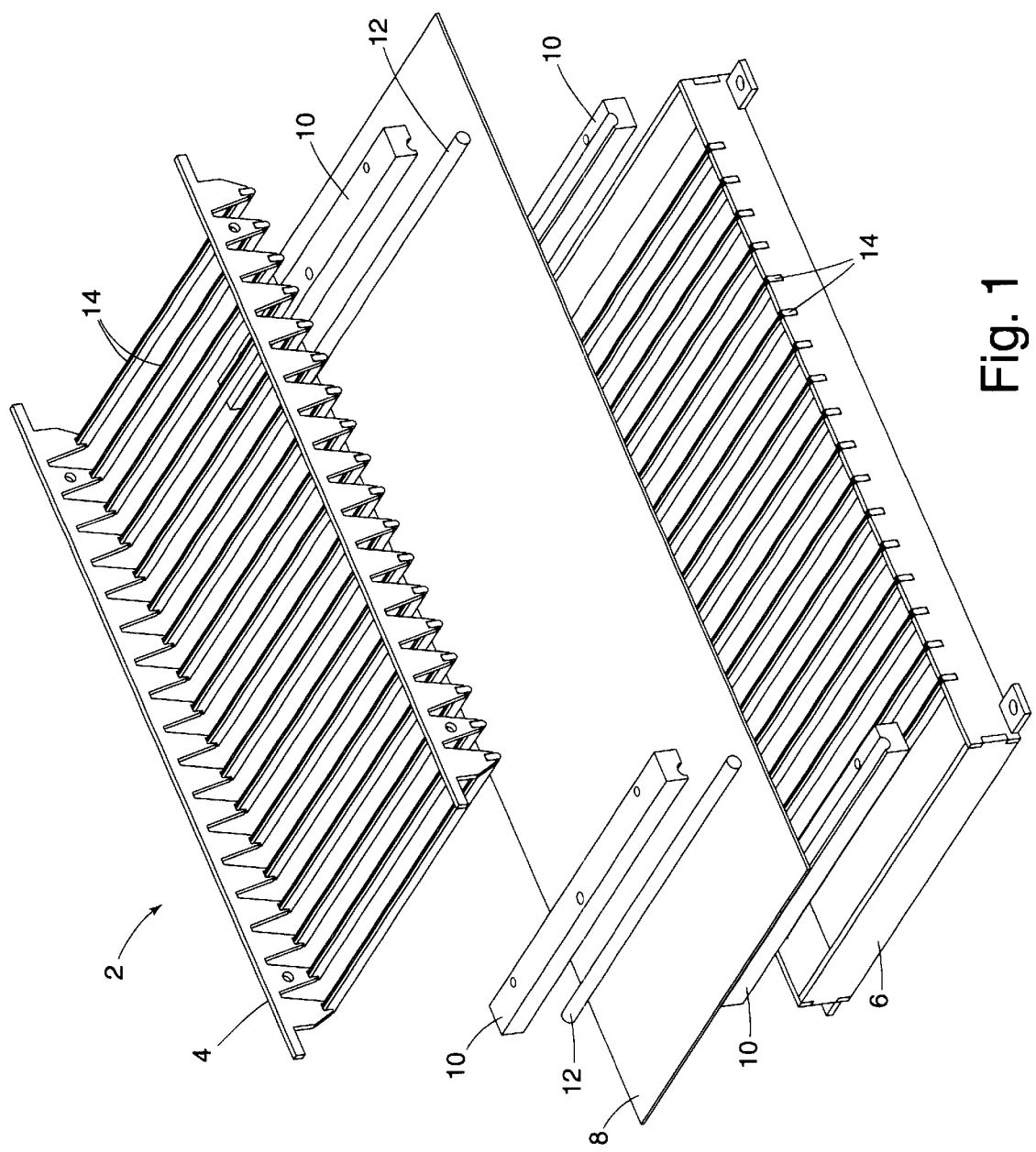
FIG. 1 is an exploded perspective view of a first embodiment of a pleated ACF filter assembly of the invention.

A preferred embodiment of the device of the present invention further comprises a control panel that includes at least one indicator that relates to a user a status of at least one control system function. More preferably, the indicator provides an indication to a user that a pre-set time has elapsed and that regeneration of the air cleaner is required. Conveniently, the device may be portable. An embodiment is contemplated wherein the housing has a particulate filter occluding the air inlet port.

A preferred embodiment of the device further comprises a fan speed controller operatively connected to the fan; and
  gas sensor operatively connected to the fan speed controller;
  whereby fan speed adjusts automatically in response to contaminant concentration as detected by the gas sensor.

In a preferred embodiment of the device, the control system comprises a gas sensor before the filter holder and a gas sensor after the filter holder;
  the gas sensors being operatively connected to a filter efficiency monitor for determining when to regenerate the filter.

Also contemplated is an embodiment wherein the control system uses time of exposure of the filter to contaminants for determining when to regenerate the filter, the time of exposure being conveniently measured by a cumulative solid state run timer.

Also contemplated is an embodiment of the device of the invention in which the filter holder is a removable cartridge comprising a frame supporting an ACF sheet, the cartridge being adapted for insertion into a complementary slot in the housing. In such an embodiment, it is preferred that the heat source is in a separate regeneration unit that is adapted to receive the cartridge.

In the device of the invention, the holder for the ACFs can take many different forms such as a frame, a stiffened scrim or a pleated mesh.

A filter of the present invention preferably comprises an activated carbon fiber (ACF) sheet. In general, the ACF sheet adsorbs substances and subsequently is induced in a controlled manner, for example by heating, to release those adsorbed substances to recover all, or almost all, of its original adsorption capacity. The uniform structure of the ACF sheeting provides more even current flow than granular carbon or carbon loaded non-woven material, minimizing localized hot spot formation during controlled heating provided by the present invention.

Through control of the length of time the ACF sheet is exposed to contaminants, and of the length of time of regeneration, the present invention demonstrates that the life of the filter can be considerable. The inventors have achieved greater than 50 regenerations. In particular, through this control, the high initial efficiency of an ACF sheet can be extended.

It is preferred that the device measure the exposure of the filter to adsorbable contaminants. Accumulated exposure time is one measure of exposure but it is also possible to use gas sensors (air quality sensors) positioned before and after the filter that each measure contaminant concentration and provide a real-time comparative analysis of the efficiency of the ACF sheet. The data is then used to trigger a "regeneration" indicator to inform the user that the ACF sheet should be regenerated.

There are several advantages to using an ACF sheet in the present invention over other forms of carbon. An ACF sheet has a high surface area and provides better adsorption (higher efficiency) than granular carbon. The continuous activated carbon fibers also provide better electrical conductivity and allow a more even current flow than granular carbon, thus providing an even heating of the ACF sheet during regeneration. In addition, because the regenerable filter of the present invention is cleaned and is not replaced routinely, the use of ACF sheets is not cost prohibitive when compared with use of disposable filters containing, for example, cheaper granular carbon.

ACF preferably has a fiber diameter of about 5 to 20 microns, more preferably 7 to 11 microns. ACF allows the preparation of ACF fabric sheets that can be either woven or non-woven (e.g. a felt). Preferably, the ACF has a surface area of about 250 to about 2000 m$^2$/g, more preferably about 1000 to about 1500 m$^2$/g. Suitable carbon fiber sheets include Kuractive™ CH700-15 (Kuraray Chemical company) having a surface area of 1500 m$^2$/g, or Kynol™ ACC-5092-10 (American Kynol) having a surface area of 1000 m$^2$/g. A preferred ACF sheet is Kuractive™ CH700-15 (Kuraray Chemical company). Activated carbon fibers derived from Actitex rayon fibers, such as Actitex RS-1301, are also suitable.

Density of weave can affect the flow of air through the fabric. ACF sheeting is advantageous in manufacturing due to ease of handling and shaping in an automated setting. Dense pleating is possible with an ACF fabric sheet and an appropriate support, owing to the flexibility of the sheet. The presence of pleating and/or a low density of weave contributes to a lower pressure drop across an ACF fabric sheet when compared to an ACF sheet that is flat and/or has a high density of weave. The pressure drop characteristics of ACF sheeting are particularly advantageous as compared to other configurations of activated carbon.

A first embodiment of the ACF filter holder 2 is shown in FIG. 1. It comprises an upper frame 4, a lower frame 6, and an ACF fabric sheet 8 between the upper and lower frames. At each end of the frames there are electrode housings 10, 10 and copper electrodes 12, 12.

The upper and lower frames 4 and 6 are generally rectangular and each has a plurality of substantially parallel pleating bars 14. The electrodes 12 are rod-shaped and the electrode housings 10 are located at opposite ends of the assembly 2. The electrodes are substantially parallel to each other. The pleating bars 14 are spaced apart as to allow the upper and lower frames to interlock when the frames are brought together. A sheet of ACF fabric 8, placed between the frames during the interlocking process, is pleated by the action of the pleating bars 14 of the upper frame 4 passing between the pleating bars 14 of lower frame 6 when the frames are interlocked. The inclusion of pleats provides an increased filter surface area for a given frame size.

When assembly is complete, the electrodes 12 are in electrical contact with the ACF sheet 8. The ends of the sheet 8 are fixed between each electrode 12 and its corresponding housing 10. The upper frame 4 and lower frame 6 are fastened together to secure the filter holder 2. When the electrodes 12 are connected to a suitable power supply, a current flows through the ACF sheet 8 perpendicular to the direction of the pleats. Low power, in the range of 0.3 to 3.0 watts/in$^2$, is required to heat the sheet 8 to a temperature of preferably about 200° F. to about 600° F., more preferably about 250° F. to about 400° F., and even more preferably about 300° F. The heat causes desorption of previously adsorbed substances and regeneration of the sheet 8. The power supply could be AC or DC but the preferred embodiment uses the household mains supply, such as the 120V AC supply found in North America or 240V AC supply of the United Kingdom, so that regeneration does not tax a more limited power supply such as that of an automobile's electrical system. After regeneration, the ACF filter is allowed to return to ambient temperature and is then ready for further use.

Figure 2:
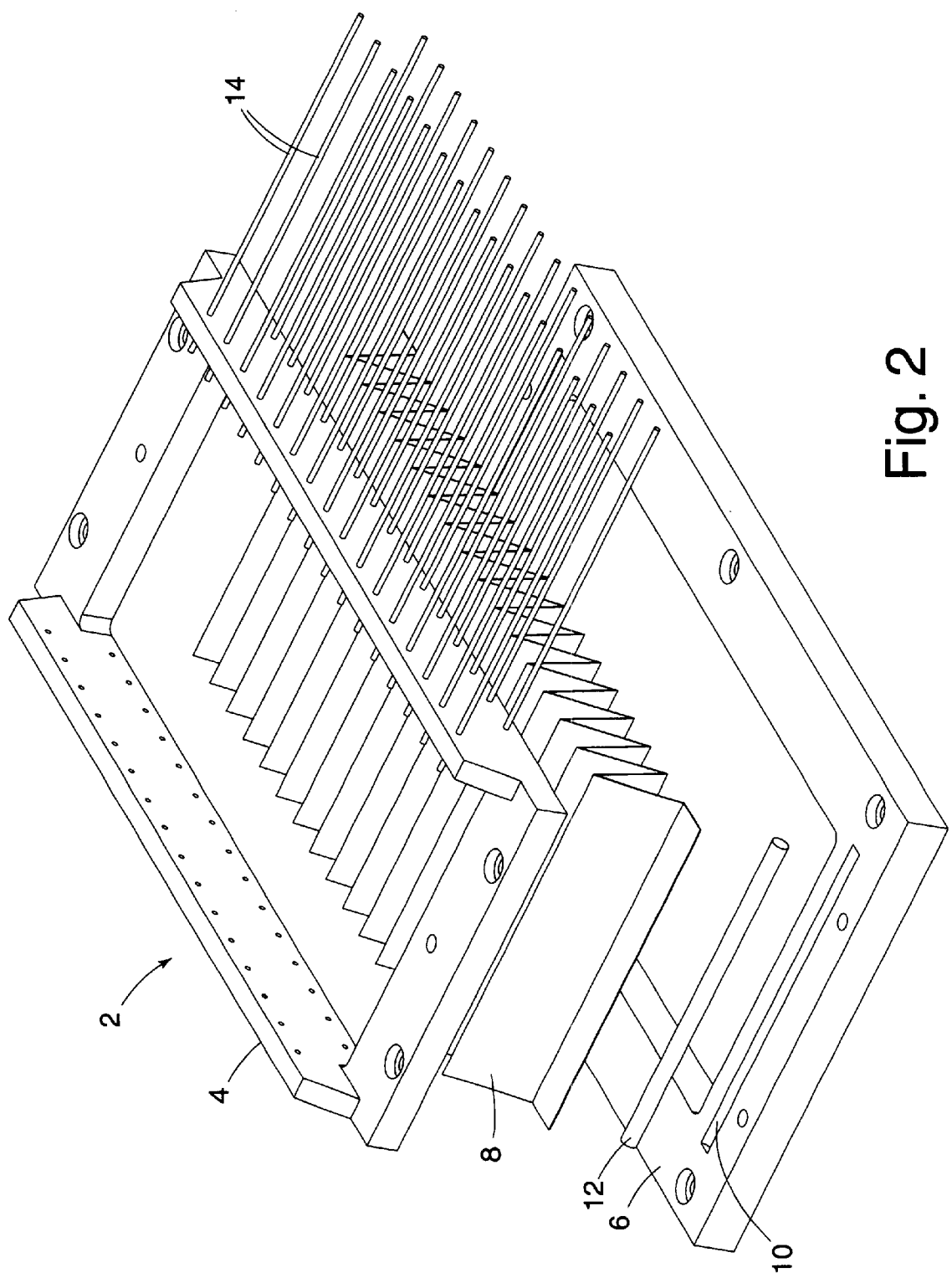
FIG. 2 is an exploded perspective view of a second embodiment of a pleated ACF filter assembly of the invention.

FIG. 2 shows a second embodiment of the ACF filter assembly 2, in which an ACF fabric sheet 8 of a length that exceeds the length of the filter holder 2 is pleated over and under pleating bars 14. These pleating bars 14 are shown removed from their operating position in the upper frame 4.

Figure 3:
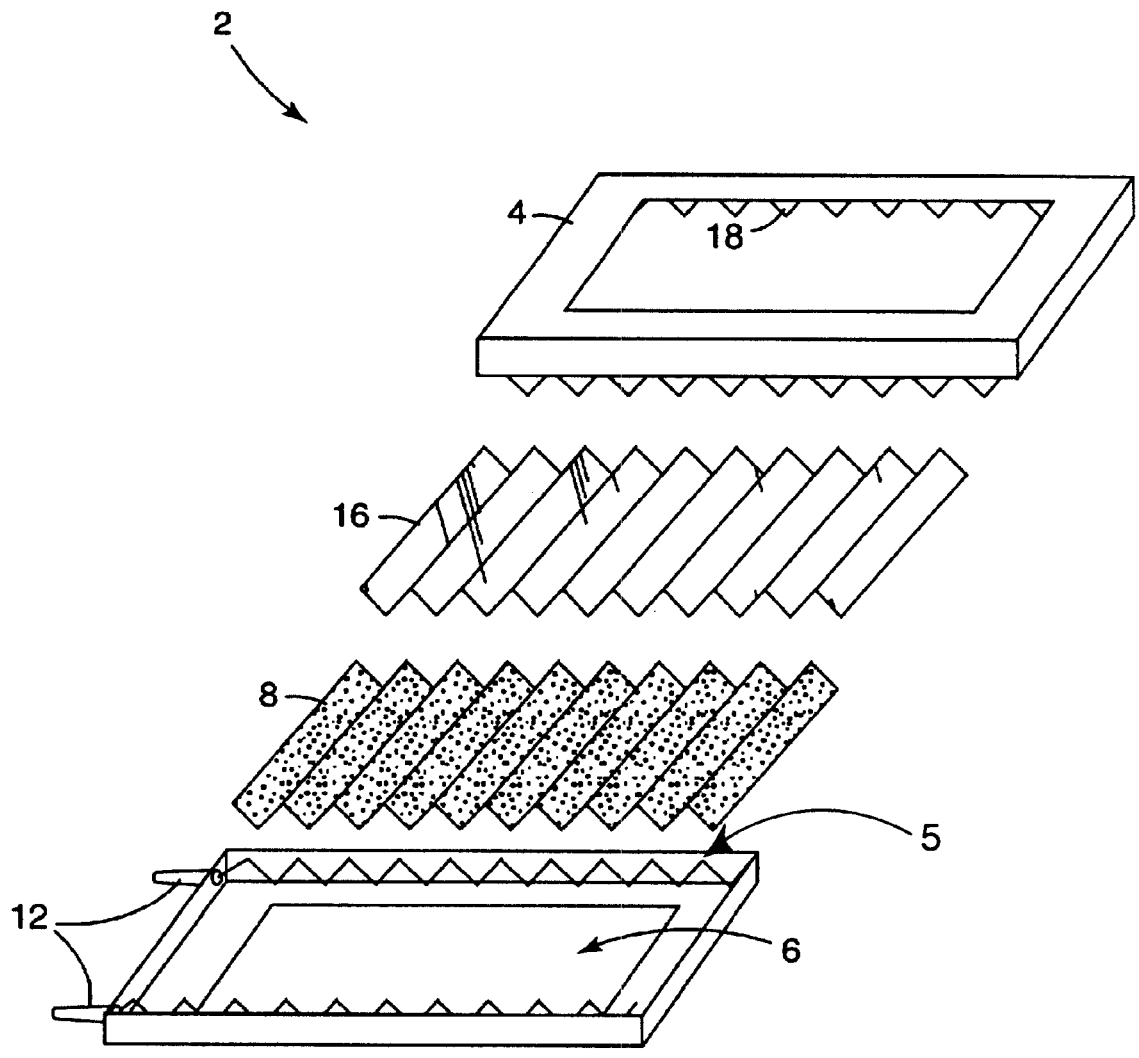
FIG. 3 is an exploded perspective view of a third embodiment of a pleated ACF filter assembly of the invention.

FIG. 3 shows an embodiment of a filter assembly 2 having an ACF sheet 8 that is held between an upper frame 4 and a lower frame 6. Pleated electrical leads 5 are provided to contact the ACF sheet 8 when the assembly 2 is put together to provide a source of current through the ACF sheet 8. A pleated glass paper mesh support 16 pleats the ACF sheet 8 in conjunction with the pleated portions 18 of the upper frame and the pleated electrodes 5, when the assembly 2 is put together. A suitable mesh support can also be made from anodized aluminum.

Figure 4:
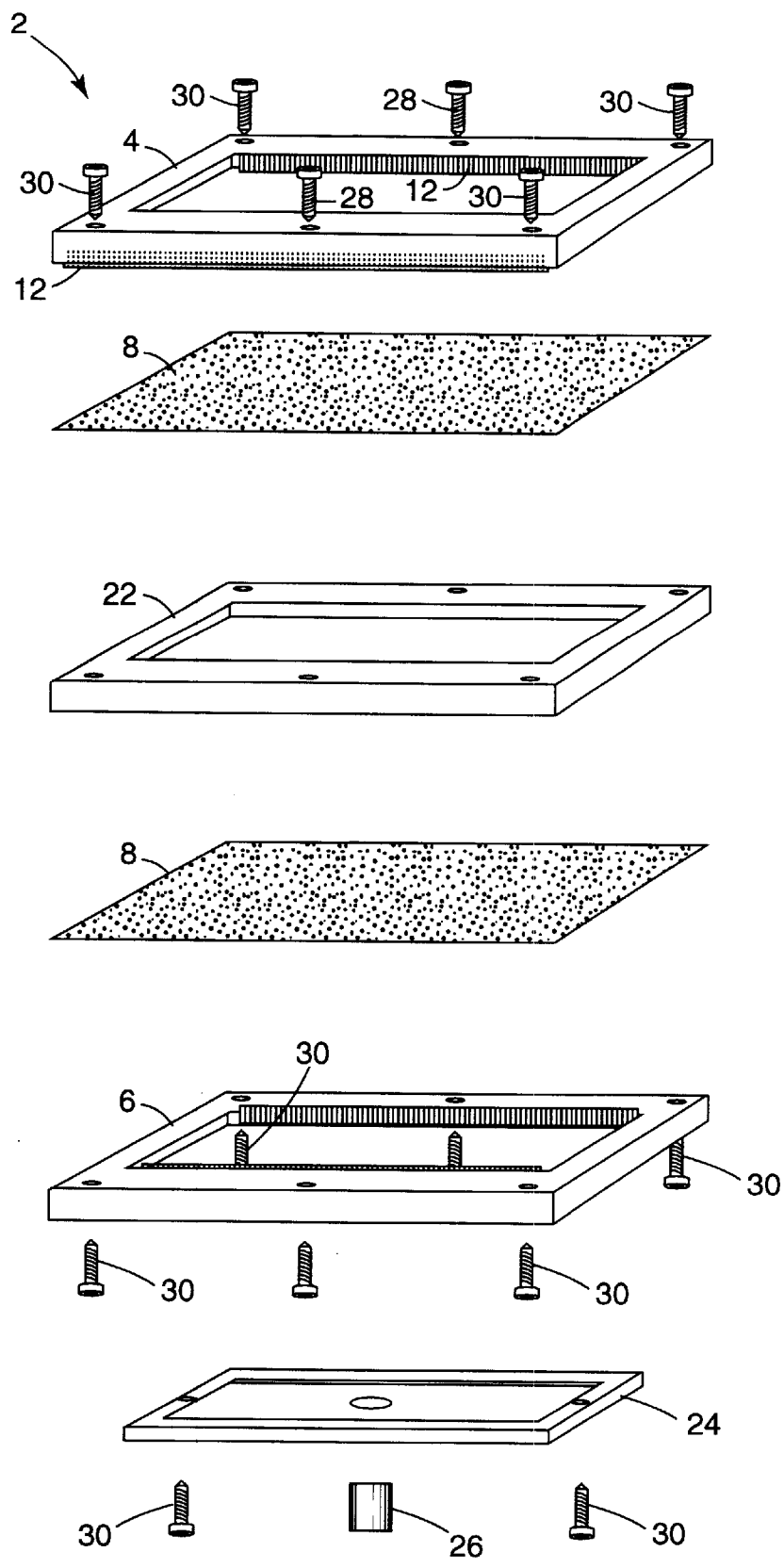
FIG. 4 is an exploded perspective view of an embodiment of a flat sheet ACF filter assembly of the invention.

Another embodiment of a filter holder 2 containing two ACF sheets 8, without pleats, is shown in FIG. 4. The ACF sheets 8 are separated by a middle frame 22 and held between an upper frame 4 and a lower frame 6. A bottom plate 24, having an inlet adapter in the form of a hose 26 through its center, is provided on the lower frame 6. The upper and lower frames include copper electrodes 12. Brass screws 28 and nylon screws 30 hold the assembly 2 together, with the brass screws 28 also acting as electrical terminals.

Figure 5:
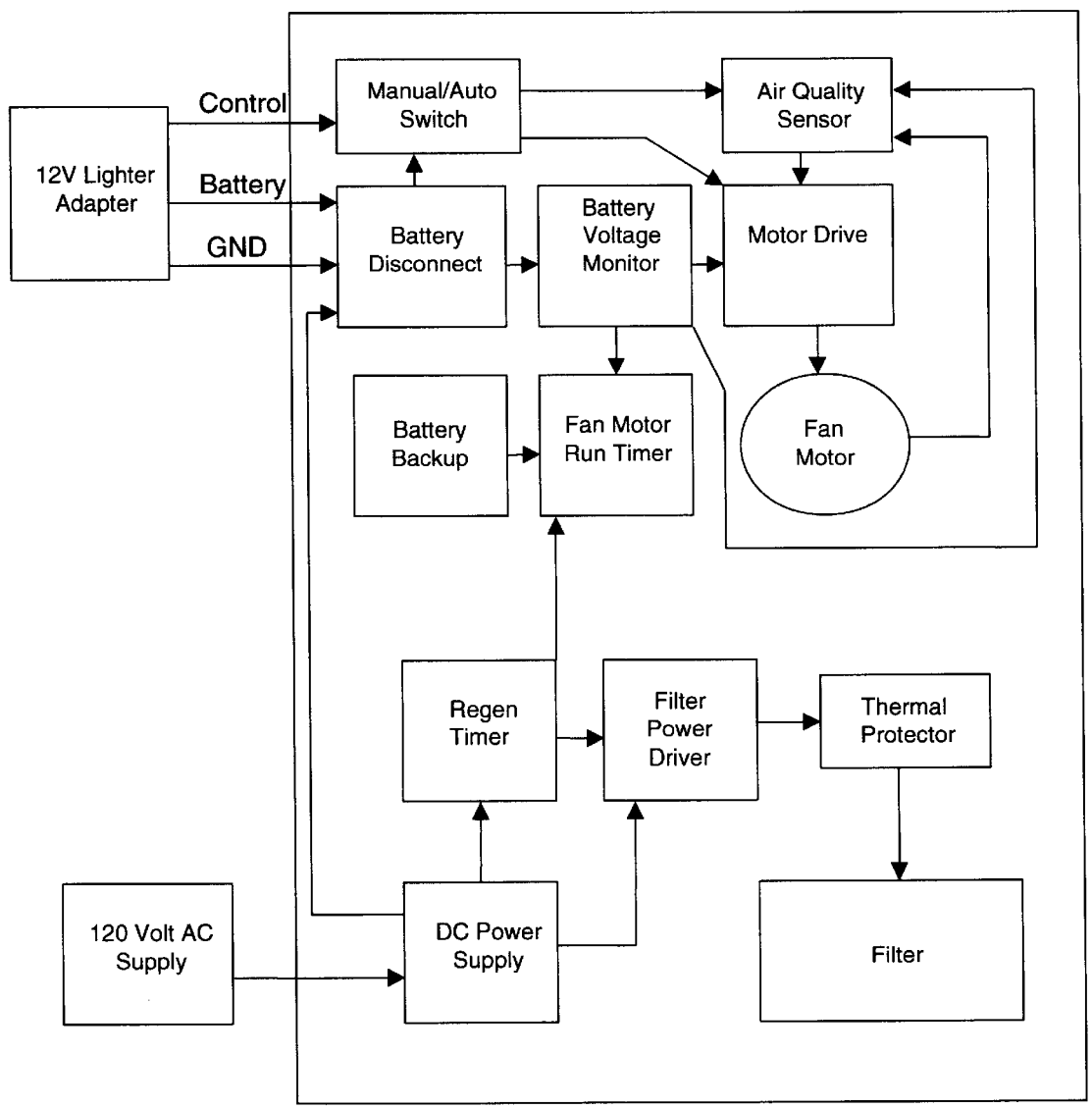
FIG. 5 is a block diagram of an embodiment of the air cleaning device electronic circuitry.
Figure 6:
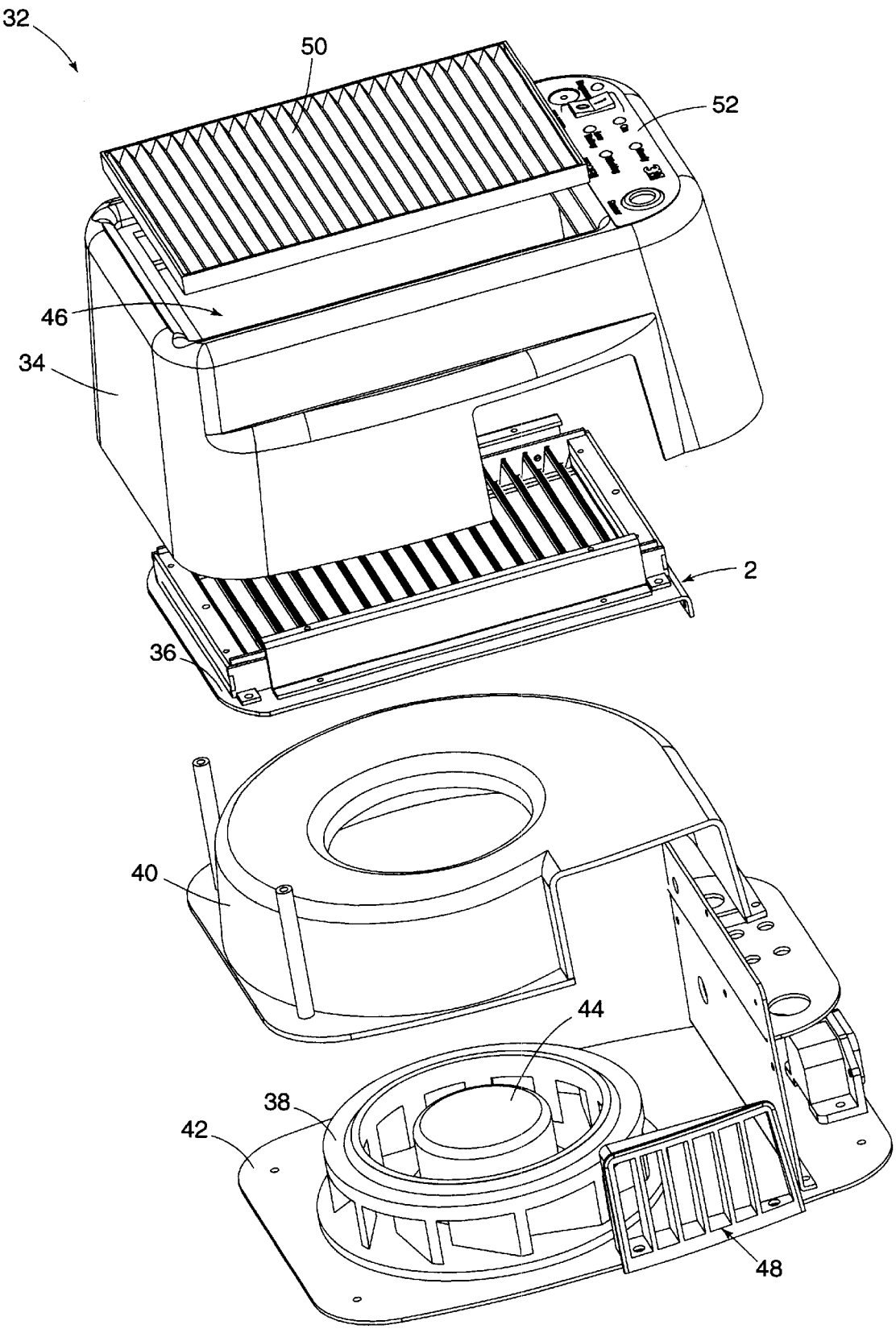
FIG. 6 is an exploded perspective view of an embodiment of the air cleaning device of the invention.

An embodiment of a portable device 32 of the invention is shown in FIG. 6. An activated carbon fiber (ACF) filter holder, including an ACF sheet (not shown), is mounted on a support 36 and is secured adjacent to a fan 38 housed in a blower wheel 40 (scroll). A housing 34 is provided to encase the fan 38 and ACF filter assembly 2, the housing 34 comprising a base 42 to which the blower wheel 40 and a fan motor 44 are mounted. The housing 34 defines a passage having an air inlet port 46 and an air outlet port 48, the fan 38 and ACF filter assembly 2 being in the passage between the air inlet port 46 and air outlet port 48. The air inlet port 46 is covered by an electrostatically charged polypropylene filter 50, e.g Filtrete® (3M), that can be replaced periodically. The air outlet port 48 is provided for egress of filtered air after the fan 38 has drawn contaminated air through the filter. During regeneration, convection currents resulting from heating of the filter carry desorbed gases upwards and out through the port 46. A control panel 52 is provided to allow the user to interface with the control systems described herein, for example with respect to FIG. 5.

Figure 7:
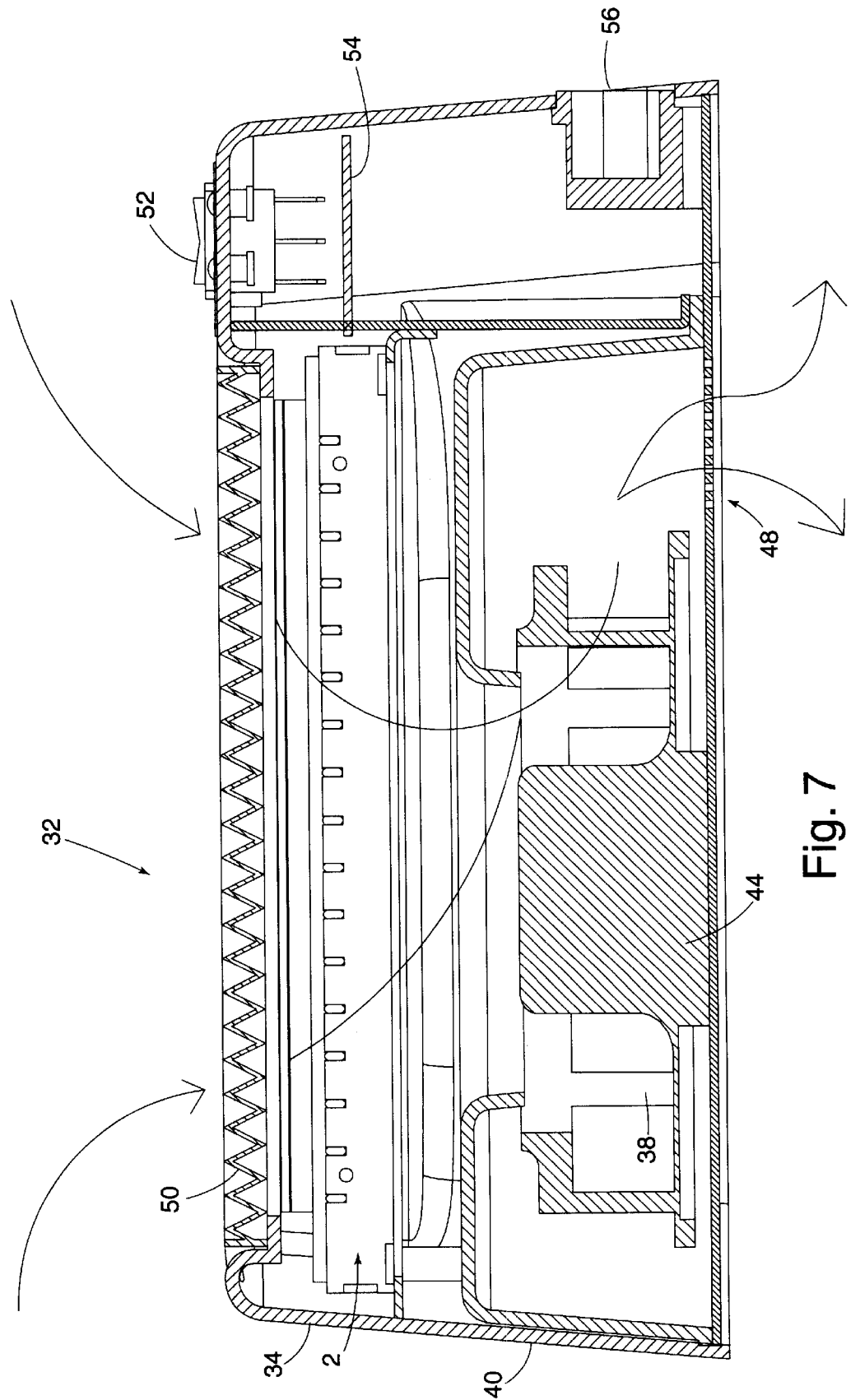
FIG. 7 is a sectional view of the embodiment of the device of FIG. 6.

FIG. 7 shows the flow of air through the device 32 of FIG. 6 when in operation. The fan motor 44 drives the fan 38 inside the blower wheel 40 to draw air through the particulate filter 50 and the filter holder 2 that holds the ACF sheet 8(not shown). The cleaned air is then forced through the air outlet port 48. Also shown is the relative position of the control panel 52, circuit board 54 and 120V connector 56.

The housing 34 is made of molded plastic, as is the blower wheel 40. The base 42 and filter frame support 36 are made of sheet metal. Other materials may be used to manufacture these elements, as appropriate.

A preferred embodiment of the air cleaning device of the present invention (FIGS. 6 and 7), that is adapted for use in motor car for example, includes the following systems.

Control Systems

The electronic controls of the regenerable air filter are an integral part of its functionality and performance. The control system not only provide options for control of the fan speed but also monitor air cleaning device usage to ensure that regeneration schedules are met. Thus, filter performance is maintained at an optimal level to ensure longevity. A series of simple audio and visual indicators keep the user informed of the air cleaning device status and when it is time to regenerate. A block diagram of the electronics is shown in FIG. 5. The circuit's function is described below.

Electronics

There are two main sections to the electronics, the filtration control circuitry and the regeneration circuitry.

Filtration Control Circuitry

The present regenerable cabin air filter (RCAF) device can be powered by an automobile's 12V lighter socket or power port with a lighter socket adapter. The adapter has a multi-position switch that allows the user to turn the power off or choose from various fan speeds when the device is in manual mode. Automobile battery voltage, fan speed control and ground signals are all fed to the RCAF device by a three conductor cable, conductor plug and socket.

If the battery voltage falls below 11 volts, a battery voltage monitor stops the fan motor, disconnects the air quality sensor heat source, suspends the run timer and turns on the "Low Voltage" indicator. This keeps the automobile's battery from being drained if the device is left on for extended periods without the vehicle running. A battery disconnect circuit disconnects the RCAF device from the automobile's 12V system when a 120V source is applied to regenerate the filter. This protects the vehicle battery and device users from high voltage in case the power adapter is left plugged in during regeneration.

A manual/auto control switch gives the user the option of controlling fan speed either manually or automatically. In manual mode, the fan speed and resultant air flow of the RCAF device are controlled by the setting on the 12V lighter socket adapter. In automatic mode, the fan speed is controlled by an air quality sensor, regardless of the manual setting on the adapter.

The air quality sensor (speed control) incorporates a sensor made of metal oxide, such as the Figar™ TGS-800 (Figaro), which detects contaminants and produces a signal that is amplified and directed to a fan motor drive that is a circuit that controls the fan's speed. Although sensors and circuits of this type respond differently to different contaminants, the general effect is to increase the speed of the fan motor as contaminant levels increase. The fan motor drive is a solid state device, such as a power field effect transistor that can be turned on and off or set by an adjustable voltage level to various speeds.

A run timer is provided that is a cumulative solid state timer that monitors the number of hours the fan motor runs. When the motor has run for a predetermined number of hours, preferably 120 hours, visual and/or audible indicators tell the operator that it is time to regenerate the filter. This controlled run time maintains the capability of the filter to remove odour. A backup battery inside the device is used to power and maintain the count in the run timer when the RCAF device is turned off or disconnected from the power adapter.

Regeneration Circuitry

A 120 volt AC signal from a mains supply is converted by the regeneration DC power supply to 12 volts DC for a regeneration timer and filter driver circuits. A similar, low power, 12 volt DC supply is used to energize the battery disconnect circuitry when the 120 volt AC supply is connected.

A solid state regeneration timer is used to control the duration of the regeneration cycle, which is about 30 minutes in the preferred embodiment of FIG. 6. This cycle is longer in devices having a regeneration temperature lower than 300 deg. F. The regeneration circuit does not have an On/Off switch but resets and starts automatically every time the device is plugged into a 120 volt AC supply turning on the filter drive circuit and the "Working" indicator until the time is complete. When complete the "Ready" indicator turns on and a reset pulse is sent to the run timer automating regeneration scheduling and timing to ensure consistent performance from the filter device.

The filter power driver turns the 120 volt AC signal to the filter on and off. The output from the filter power driver is delivered through a variable dimmer type voltage control to adjust the high voltage signal to 50 volts which produced a filter temperature of 300 deg. F. A thermal protector of the Elmwood Sensors type DXXX is connected in series with the filter power connections and placed in close proximity to the filter. If a problem occurs with the RCAF device that causes the filter to overheat to a dangerous or self destructive temperature, the thermal cut-off opens and disconnects the power to the filter.

Alternative Circuitry

An alternative to the blocks of discrete component circuits described above is a microprocessor-based circuit. A microprocessor is able to handle all the control functions described above with one chip, a few external components and indicators. If a microprocessor is chosen with nonvolatile memory on board, then the battery backup is not necessary to maintain run time counts. Using this type of circuit over the standard discrete component circuit would result in a simpler, smaller, more versatile and less expensive control system.

Although one embodiment has been described in detail with reference to FIGS. 6 and 7, it will be appreciated that the invention can be embodied in many different ways.

Figure 10:
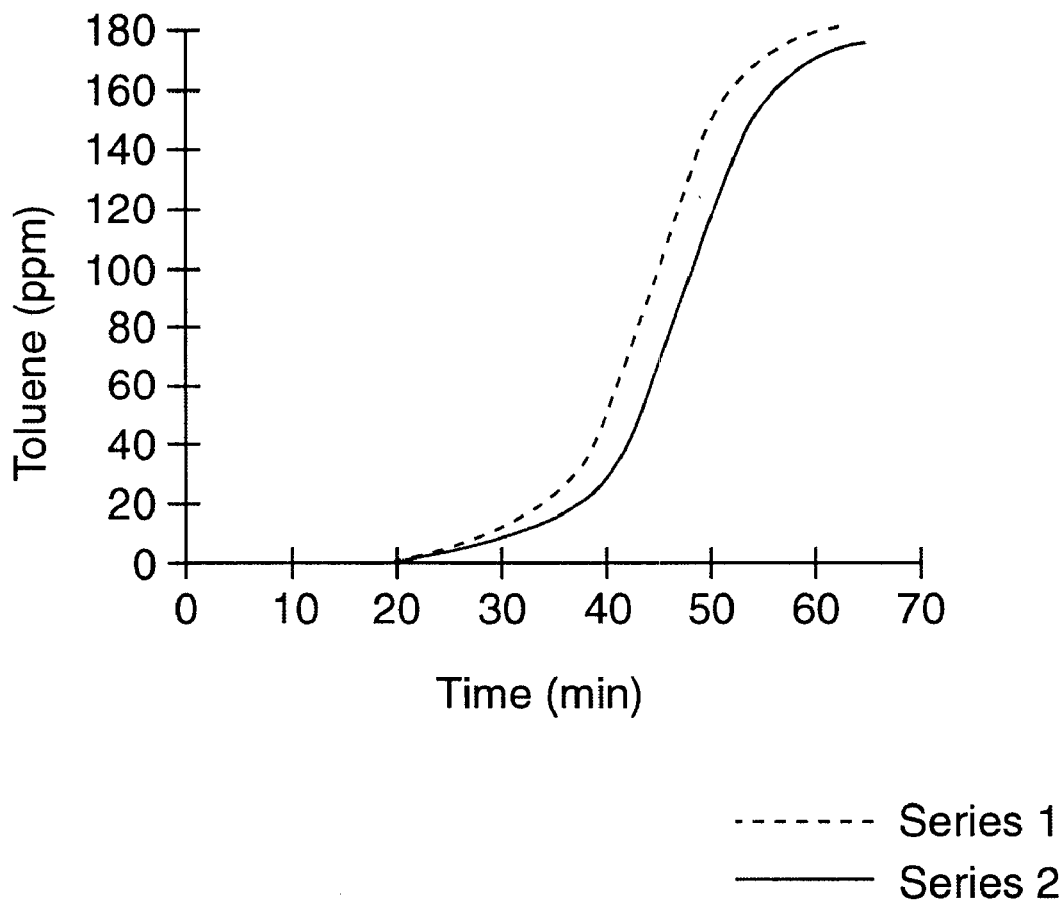
FIG. 10 is graph of detected toluene concentration (ppm) versus time (minutes) at a flow rate of 40L/min using a total concentration of toluene of 190 ppm and 48 inch$^2$ of ACF sheet (Kuractive CH700-15). The ACF sheet was regenerated between series 1 and 2.

FIG. 10 is a graph showing the amount of passage of a contaminant (toluene) through the filter as a function of time. It shows the high efficiency of ACF sheeting in the presence of 200 ppm of toluene and 40% humidity, and the subsequent decrease in efficiency with saturation. There was no detectable passage of toluene for the first 20 minutes, i.e. all the toluene was adsorbed. Regeneration, which occurred between series 1 and series 2, is also shown to have occurred successfully, in that the efficiency is recovered as demonstrated in the results of series 2.

Regeneration can be satisfactorily carried out at about 300° F. or greater. Preferably, the temperature used in the filter is about 300° F. The power required to resistively heat the filter of FIG. 1 to 300° F. was found to be about 25 watts. With a 50 Volt potential across the filter the current draw is about 0.5 amps. Other embodiments may have different power requirements that can be readily determined.

As well as heat generation utilizing electrical resistance, embodied in FIG. 1 by a pair of electrodes that are elongated in the plane of the ACF sheet, spaced apart thereon, and connected to a suitable power supply (not shown), also possible is a radiant heat source. With such a radiant heat source, care must taken to distribute heat evenly on the ACF sheet. In an embodiment of the invention that is part of a motor vehicle's HVAC, the heat source can be a radiating heat source adjacent to the filter, such as piping connected to a vehicle engine cooling system, that utilizes inherent heating capacity of the vehicle's engine when running.

It is possible to heat the ACF sheet using both resistance heating in the ACF sheet and radiant heat from an adjacent source. An important factor in heating the ACF sheet is to provide an even heat across the sheet.

It is possible to integrate the ACF filter and the fan by covering at least part of an inner surface of the blower wheel with ACF fabric sheeting and adapting it for regeneration. This can be done, for example, by providing electrodes on the ACF sheet as discussed herein.

A control panel can be provided on the housing to assist users in inputting settings and monitoring of the device status. In the embodiment of FIG. 6, a series of simple audio and visual indicators is built into the control panel to keep the user informed of the device status and when it is time to regenerate. The audio indicator can be a buzzer or bell or the like. Visual indicators can be light bulbs or LEDs or other such optical stimulators.

Although in FIG. 5 a 12V lighter socket adapter is shown as a connector to provide power to the fan, the connector could be for connection to a mains power supply, such as 120V AC in North America or 240V in Europe, or to a battery. Also contemplated is a connector means comprising a connector for at least two of the power sources outlined above, together with switch to allow selection of an appropriate connector for a chosen power supply.

A suitable motor for fan 38 is a RER125/12NG (EBH/PAPST) 5.4 inch diameter model that can move about 50 cubic feet per minute with the filter in place. At that rate, a 60 cubic feet car interior will be cleaned in a few minutes. The motor is brushless and has backward curved fan blades providing quiet running and long life.

Figure 8:
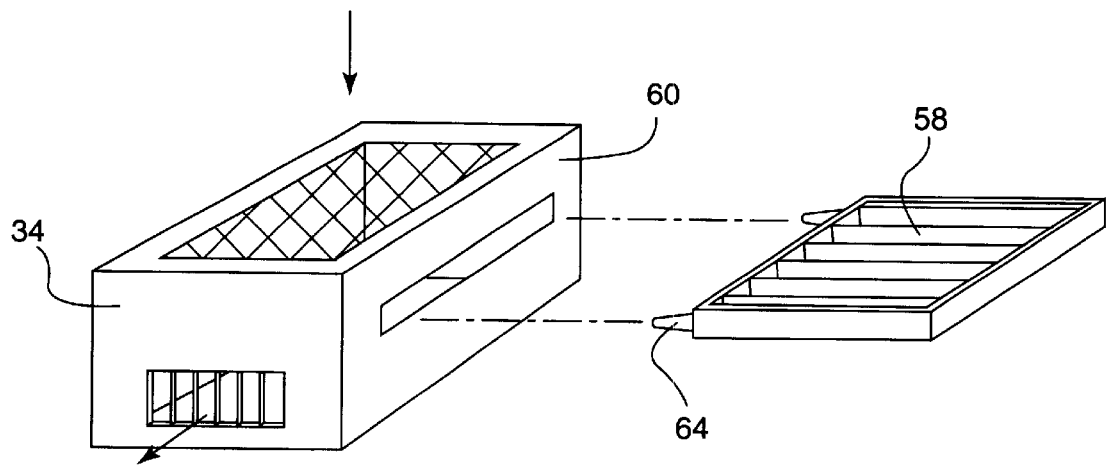
FIG. 8 is a perspective view of a schematic representation of an embodiment of the air cleaning device of the invention that has a removable filter frame.
Figure 9:
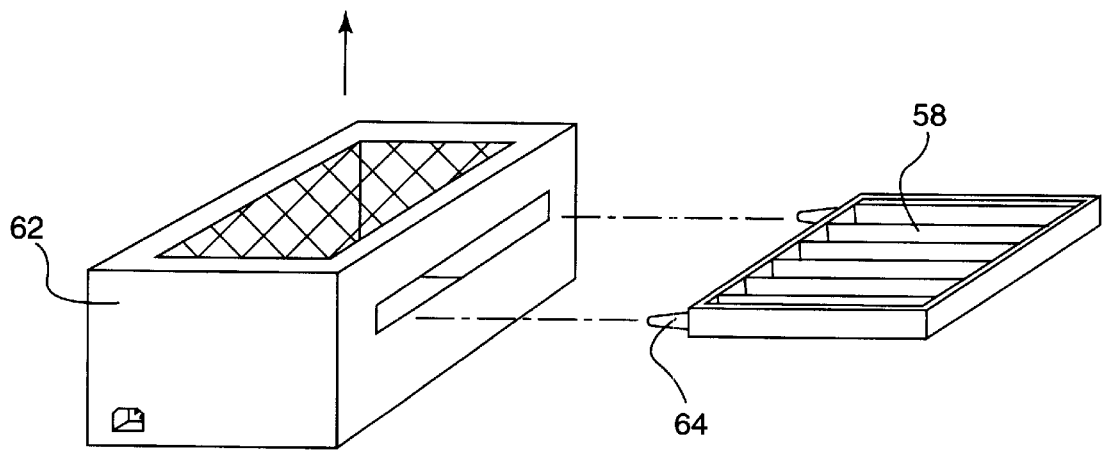
FIG. 9 is a perspective view of a schematic representation of an embodiment of a regeneration unit according to the invention for regenerating a filter on the filter frame of FIG. 8.

Also contemplated in FIG. 8 is an embodiment of a portable or integrated filter device in which the filter holder is in the form of a cartridge 58 and is removably mounted in a slot in the housing 34 in an airtight manner. The cartridge 58 is adapted so that, after removal, it can be inserted into a separate regeneration unit (FIG. 9) containing an electrical power supply that contacts protruding electrodes 64 and regenerates the ACF sheet when current flows. For example, resilient clips may be provided on the cartridge 58 to mount the cartridge 58 in the device. An airtight seal can be provided for example by a flexible rubber seal, fixed to the device and directed into the slot, which contacts the cartridge when it is mounted in the slot.

With respect to the embodiments of the air cleaning device of the invention disclosed herein, it would be apparent to a person skilled in the art that certain elements can be replaced by other elements that can perform the necessary function. For example, the upper and lower frames 4 and 6 of the filter holder 2 must be able to withstand regeneration temperatures and are manufactured from an epoxy-based polymer, a phenolic polymer, or polytetrafluoroethylene (PTFE), although other substances that provide the required properties may also be used.

Although the electrodes are made from copper there are, of course, many other conducting materials that can be used.

Although screws are used to secure the filter holder 2, any appropriate securing means (e.g. rivets, resilient clips, adhesive, etc.) may be used.

Results

The device of FIG. 6 has been tested in three categories: rate of contaminant removal, loading capacity, and ability to regenerate. The effectiveness of the filter in these categories was tested with contaminants toluene and pentane. Selected testing was also performed with sulfur dioxide, n-butane and isobutane.

The experiments were conducted inside an airtight, acrylic test box (510 L/18.01 ft$^3$). The box was equipped with an injection port, internal air circulation fan, power bar, 12 V DC adapter, thermocouple with digital output, and an exhaust vacuum to a nearby fume hood. Leak tests and natural decay tests were performed with each contaminant and the rate of natural decay was found to be insignificant in each case.

With the ACF (Kuractive 700-15, 1500 m$^2$/g) filter in place, the volumetric flow rate of the device was measured at different fan settings (12 and 14.5 Volt DC power supply). Using a large plastic bag of known volume and a stopwatch, the flow rates were calculated for the low, medium, and high fan settings.

12 Volt DC Power Supply

| Low | 15.4 CFM/43.3 L/min |
| Medium | 24.9 CFM/704.6 L/min |
| High | 27.9 CFM/791.7 L/min |

14.5 Volt DC Power Supply

| Low | 16.8 CFM/475.7 L/min |
| Medium | 28.6 CFM/809.9 L/min |
| High | 32.7 CFM/927.3 L/min |

CFM = Cubic feet per minute.

These values were used in all calculations with the unit powered via 12 V DC for all tests. A twenty-minute regeneration cycle reaching a maximum temperature of 308° F. was used for most tests.

The quantity of contaminant present in the test chamber was kept in the ppm range and was continuously monitored using a MIDAC Series I FT-IR system (MIDAC Corporation, Irvine, Calif.). It was assumed that the internal circulation fan would maintain a homogeneous concentration of the gas phase contaminant. Known amounts of liquid toluene and pentane were injected into the test chamber where they quickly evaporated. n-Butane, isobutane and sulfur dioxide were added to the system in the gas phase in known volumes.

To test the rate of removal of contaminants by the filter device, the fan was activated after contaminant concentration in the chamber had reached equilibrium. The fan was disengaged when the contaminant concentration ceased to change significantly (>0.5% of original concentration) between sampling intervals (10 sec). The unit was then regenerated outside the box and allowed to cool to ambient temperature before proceeding with the next test.

To test the loading capacity of the filter device, the contaminant was injected into the chamber in known quantities, allowed to reach an equilibrium concentration, and then the fan (on high) was engaged. Once the concentration of the contaminant ceased to change significantly (>0.5% of original concentration) between sampling intervals (10 sec), the fan was turned off and more of the same contaminant was introduced. This continued until the unit failed to return the concentration of the contaminant to a reasonable level (below 100 ppm).

Method of Analysis

A pseudo-first order model was used to calculate the rate constant ($K_{ad}$) for the removal of the contaminant. This value was determined by calculating the negative slope of the natural log of the contaminant concentration during the adsorption cycle when the fan was on. The clean air delivery rate (CADR) was then calculated by multiplying the rate constant by the volume of the testing chamber. The efficiency of the filter device at cleaning the contaminated air inside the test chamber was determined by dividing the CADR by the flow rate of the filter device at that specific fan setting.

Removal Rate Testing Results

Rate of Removal Testing: Toluene

Figure 11:
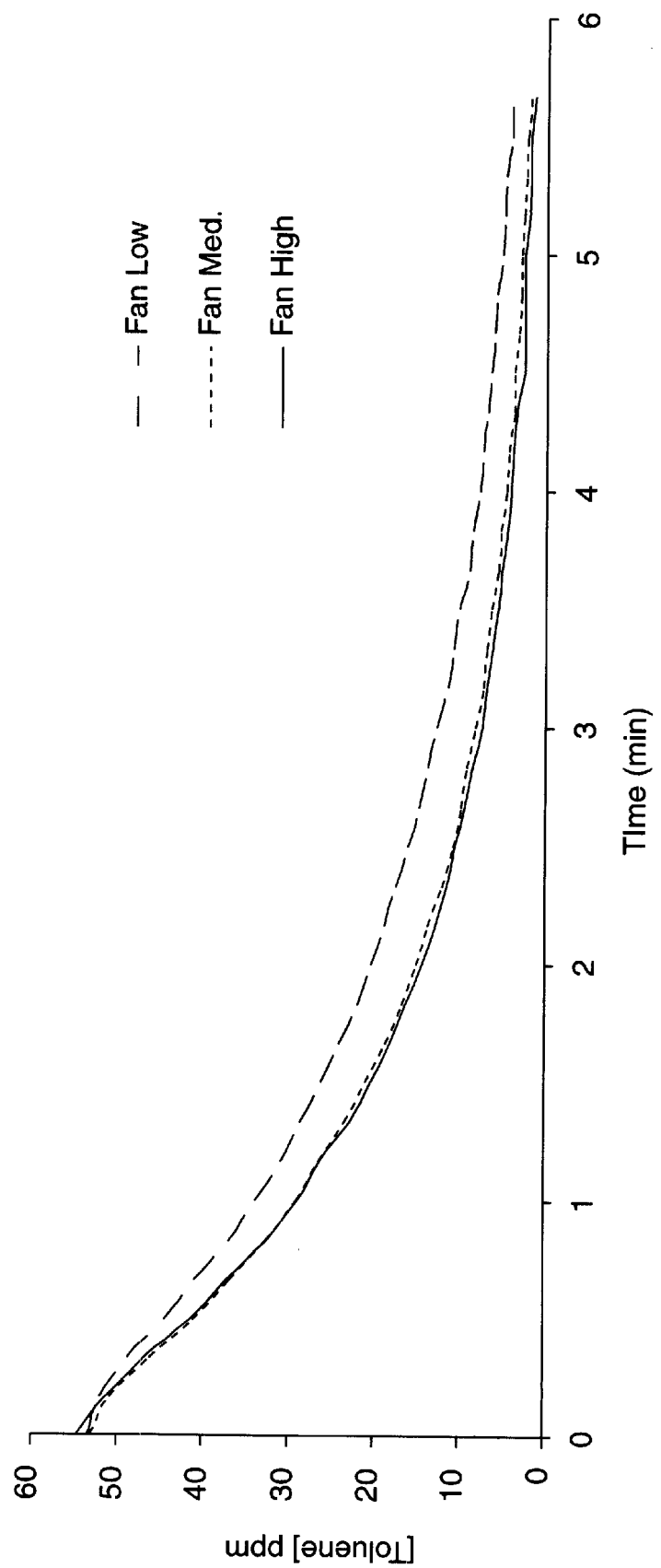
FIG. 11 is a graph of toluene concentration (ppm) versus time (minutes) at different fan settings (low, medium and high) powered by a 12 volt supply.

Toluene was used as a testing contaminant for the filter device. Three rate of removal tests were completed at each fan setting. As the fan speed was increased the CADR increased slightly, suggesting that at higher fan speeds the filter efficiency is lower. The results of the removal rate study for toluene are shown in Table 1. A graph of concentration versus time is shown in FIG. 11.

Rate of Removal Testing: Pentane

Figure 12:
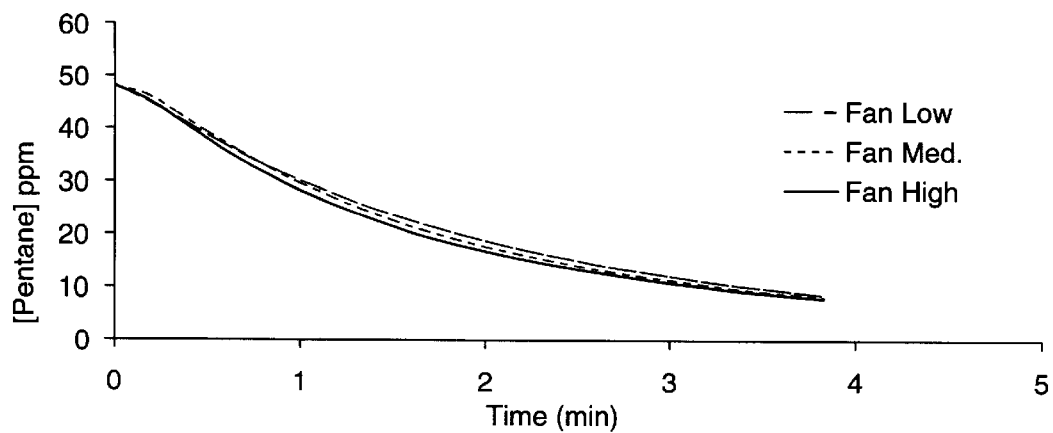
FIG. 12 is a graph of pentane concentration (ppm) versus time (minutes) at different fan settings (low, medium and high) powered by a 12 volt supply.

Pentane was also used as a testing contaminant for the filter device. The fan speed had a minimal effect on the rate of removal. An 80% increase in the flow rate resulted in an approximate increase in CADR of only 5%. The results of the rate of removal study for pentane are shown in Table 1. A graph of concentration versus time is shown in FIG. 12.

Test contaminants n-butane and sulfur dioxide were also studied using the methods described above. The results are also included in Table 1.

TABLE 1

| VOC | Fan Setting | CADR (L/min) | Efficiency |
| --- | --- | --- | --- |
| Toluene | Low | 249.5 | 57.1% |
| Toluene | Medium | 303.3 | 43.0% |
| Toluene | High | 308.8 | 39.0% |
| Pentane | Low | 233.0 | 53.0% |
| Pentane | Medium | 244.0 | 34.6% |
| Pentane | High | 245.6 | 31.0% |
| n-Butane | High | 139.4 | 17.6% |
| Sulfur dioxide | High | 40.4 | 5.1% |

Filter Regeneration Test Results

Regeneration Cycle

Figure 13:
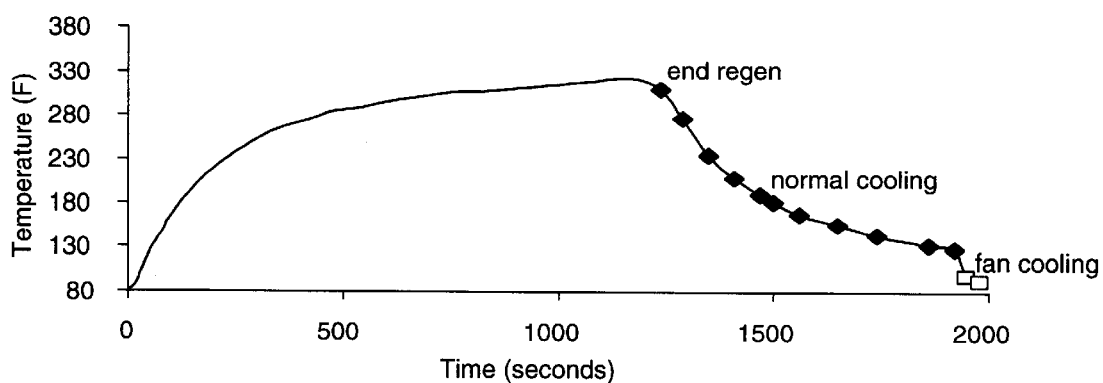
FIG. 13 is a graph of temperature (F) versus time (seconds) for a regeneration cycle.

The ability of the ACF filter to regenerate was monitored during the rate of removal and loading capacity testing. FIG. 13 shows the Temperature versus Time plot at the ACF filter surface during a twenty minute regeneration cycle. All of the regeneration cycles used in this series of testing were twenty minutes in length with a peak temperature target of about 300° F.

Figure 14:
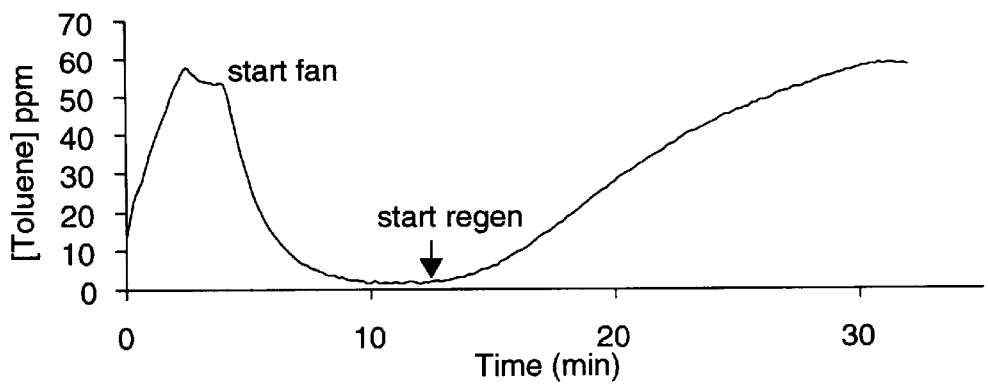
FIG. 14 is a graph of toluene concentration (ppm) versus time (minutes) during an adsorption and regeneration cycle.
Figure 15:
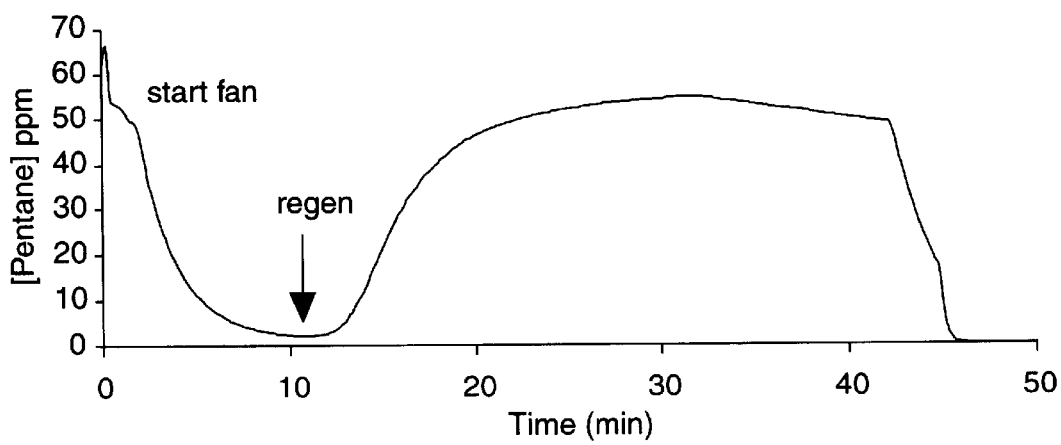
FIG. 15 is a graph of pentane concentration (ppm) versus time (minutes) during an adsorption and regeneration cycle.
Figure 20:
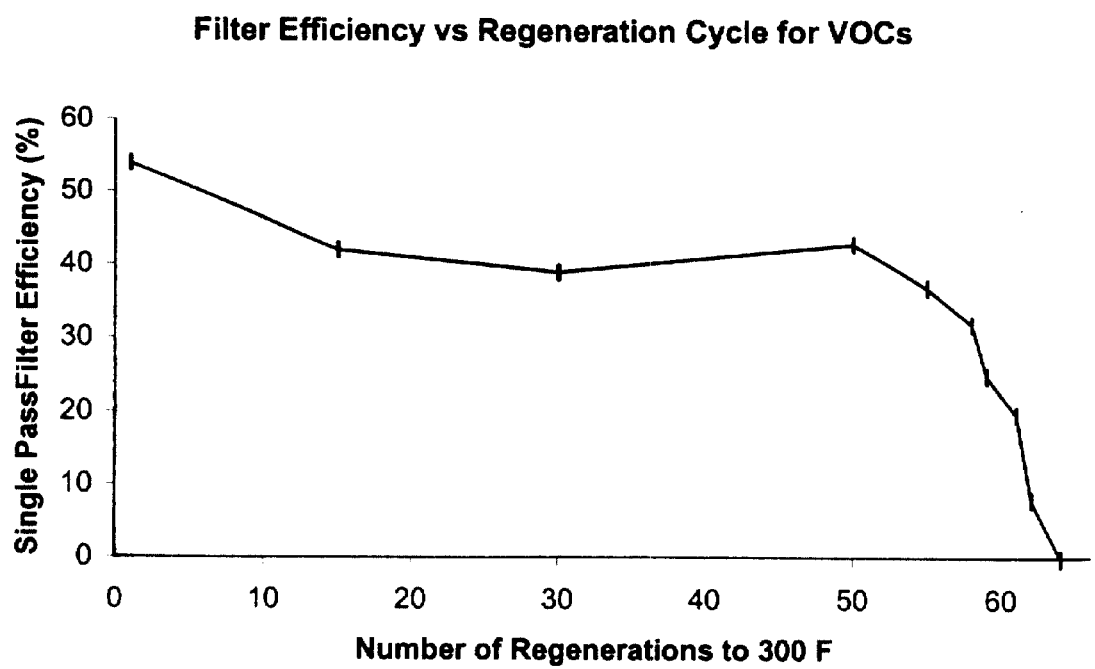
FIG. 20 is a graph of single pass filter efficiency versus number of regenerations to 300° F.

When tested with toluene and pentane almost all of the adsorbed contaminant was desorbed from the filter during the regeneration cycle. The results of the regeneration effectiveness tests are shown in FIGS. 14 (toluene) and 15 (pentane). After the regeneration cycle, the contaminant concentration was returned to its initial level. The filter device has been regenerated more than 50 times with no significant signs of deterioration (FIG. 20), other than some discoloration of the internal filter due to heat exposure. For most cycles, a given amount of VOC was absorbed before regeneration. There were a few cycles in which, to test filter capacity, the filter was saturated before regeneration.

Residual Contaminant Testing

After loading the filter device to capacity, the residual contaminant remaining on the filter was examined after one regeneration cycle. Once the unit had cooled to ambient temperature it was placed back into the test chamber. The unit was then regenerated for a second time while the contaminant concentration was monitored by the FT-IR system.

After adsorbing and regenerating about 1.4 g of toluene, the filter released a residual amount of about 90 mg of toluene in the second regeneration. The filter adsorbed approximately 0.6 g of pentane during the loading capacity test and then released a residual amount of about 5 mg of pentane in the second regeneration.

Regeneration and Temperature Studies

Figure 16:
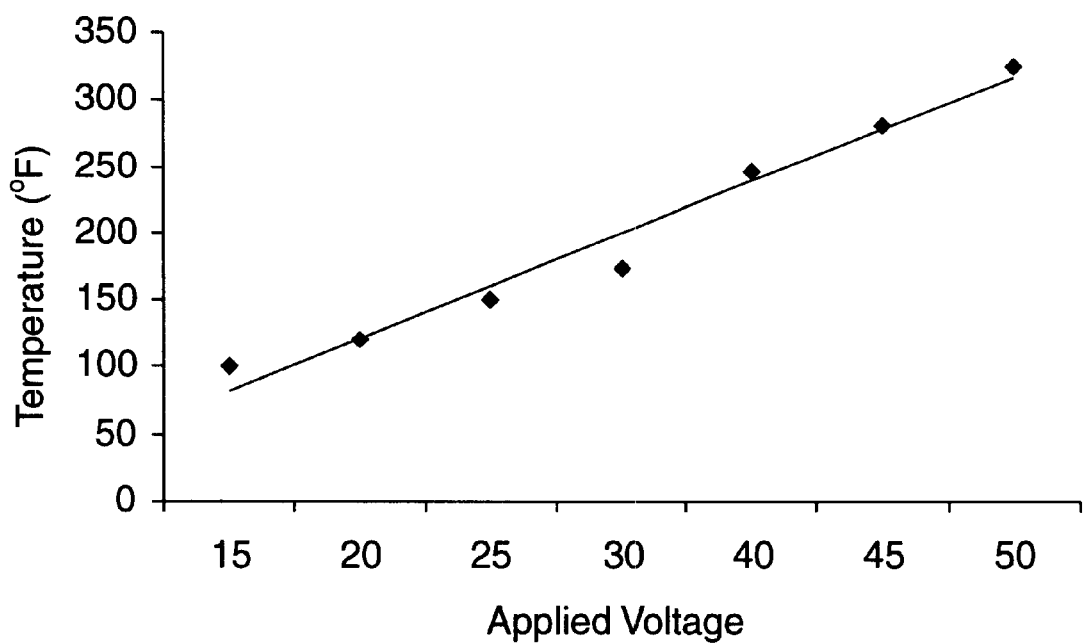
FIG. 16 is a graph of ACF filter temperature (deg. F) versus applied voltage (V).

The filter device was also evaluated for VOC retention at elevated temperatures. A temperature-voltage relationship was first established for the filter device (FIG. 16). Toluene or pentane were then introduced to the filter at various loads and allowed to absorb. The filter was then heated to preset temperatures that one may experience in an automobile (i.e. 100–150° F.) and allowed to equilibrate. The vapor concentration was then measured and compared to the total load. $K_d$ represents the molar distribution ratio of the VOC in the vapor phase to that adsorbed onto the filter. The results are shown in Table 2.

TABLE 2

| VOC | Load (μL of liquid) | $K_d$ @ 100° F. | $K_d$ @ 150° F. |
| --- | --- | --- | --- |
| Toluene | 200 | 0.057 | 0.152 |
| Toluene | 750 | 0.051 | 0.137 |
| Toluene | 1400 | 0.162 | 0.134 |
| Pentane | 200 | 0.076 | 1.050 |
| Pentane | 750 | 0.241 | 0.841 |
| Pentane | 1400 | 0.319 | 0.630 |

Molar Distribution Constants ($K_d$) for ACF Filter

The above table illustrates that, although the ability of the ACF filter to retain VOCs is highly temperature dependent, it is only slightly load dependent.

Longevity

The ACF filter performed consistently on more than 60 adsorption and desorption cycles. The filter remained in good condition with only slight discoloration of the pleating bars.

Pressure Drop Comparison

Figure 17:
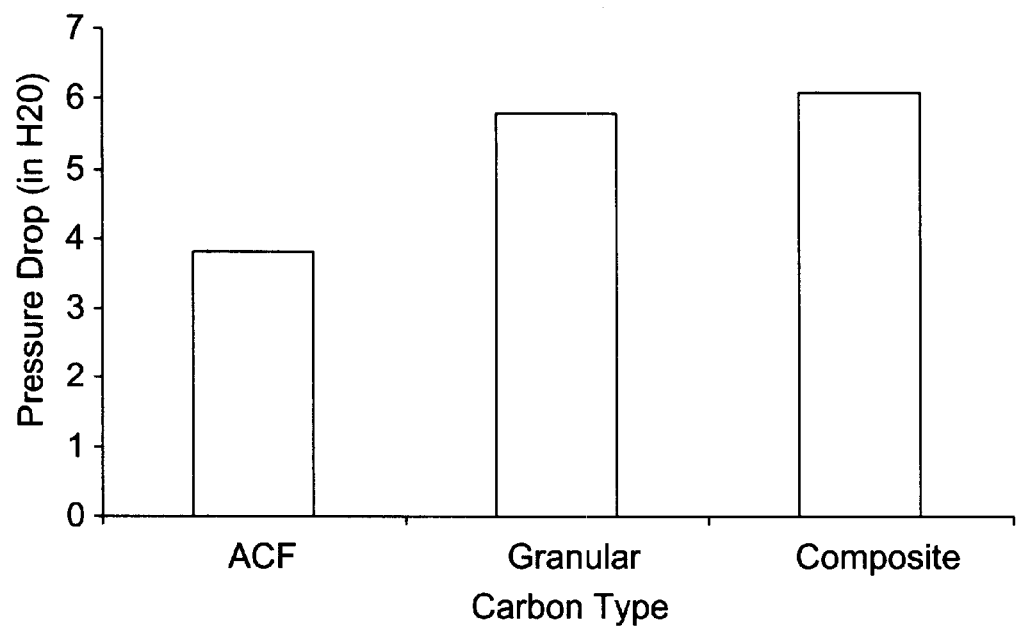
FIG. 17 is a graph of pressure drop (inches of $H_2O$) versus carbon type.

The pressure drop of various forms of activated carbon were measured and compared to ACF. The materials used were 125 g/m² ACF, 375 g/m² granular carbon on a plastic netting and 1750 g/m² composite material made up of granular carbon and urethane binder. All materials were tested at a face velocity of 1 m/s in flat form. As shown in FIG. 17, the granular carbon materials have pressure drops as much as 60% higher than the ACF on a per unit area basis. Pleating of the ACF sheet will further reduce the pressure drop when comparing the materials on a volumetric flow basis.

Gas Removal Efficiency Comaparison

Figure 18:
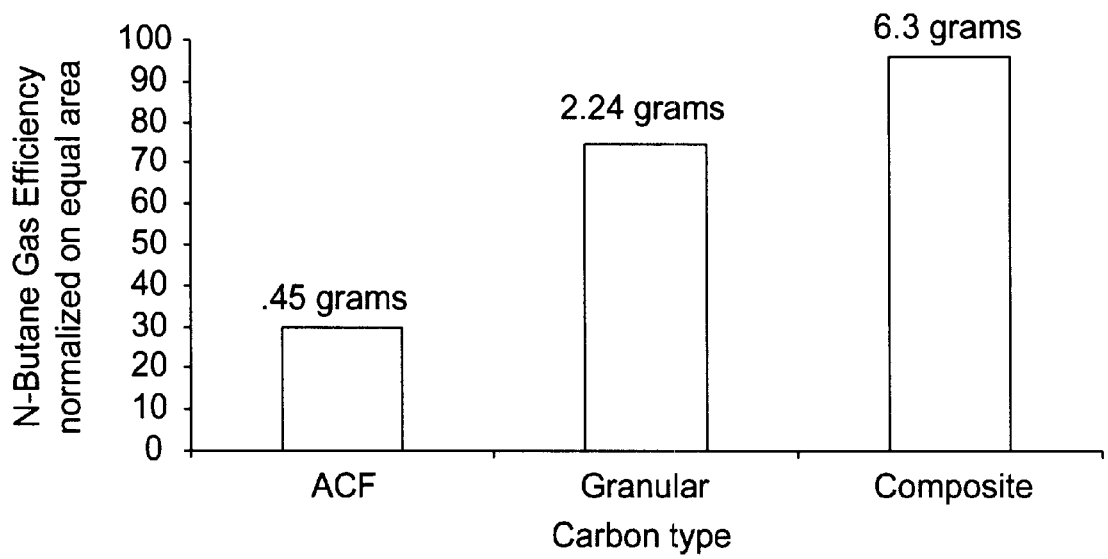
FIG. 18 is a graph of gas efficiency versus carbon type, on a per unit area basis, using n-butane as the absorbing gas.
Figure 19:
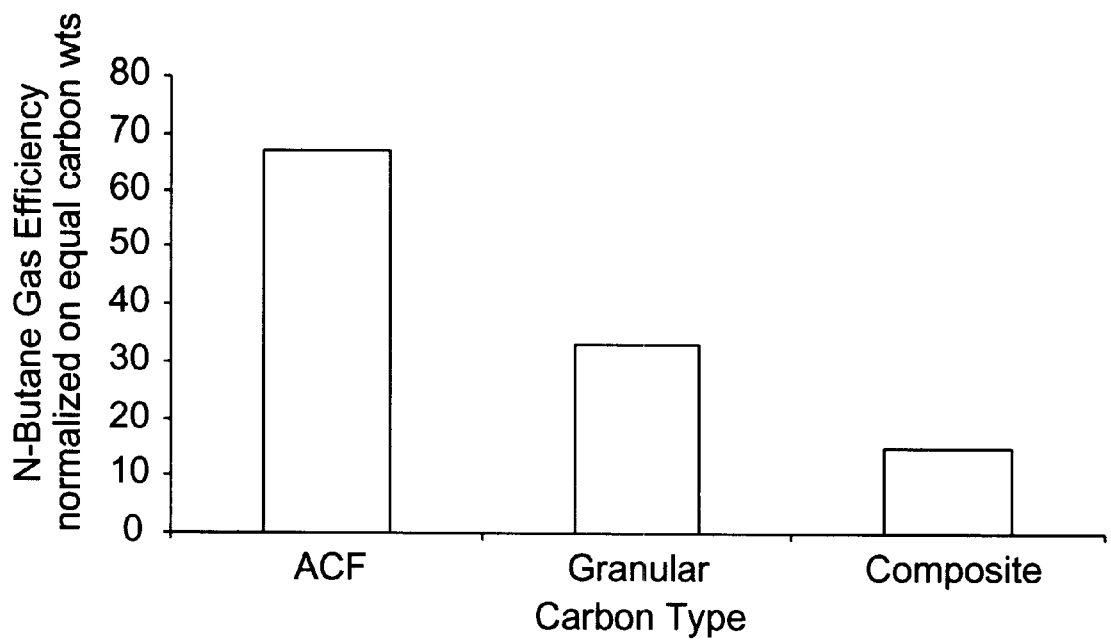
FIG. 19 is a graph of gas efficiency versus carbon type, on a per gram basis, using n-butane as the absorbing gas.

The same materials used for the pressure drop comparison were also used for gas removal comparisons. In one comparison, 60 mm×60 mm flat samples were tested against N-butane at a concentration of 80 ppm and a flow of 0.14 m/s. As shown in FIG. 18, the granular and composite carbons have higher gas removal efficiencies than ACF, based on equal area flat samples. However, because the ACF is flexible, it can be pleated. Therefore, pleated ACF sheeting increases the amount of carbon in a filter thus increasing the gas removal efficiency. When comparing the ACF to the granular or composite carbon material on a per gram basis, the ACF is more efficient (see FIG. 19).

What is claimed is:

1. A regenerable air cleaning device comprising:
    a filter holder supporting a closed loop regenerable filter sheet that includes activated carbon fibers (ACF), said filter being fixed and supported by the filter holder wherein the filter is supported across a length of the filter between a filter front face and a filter rear face;
    a control system that is adapted to determine when to regenerate the regenerable filter; and
    a heat source is provided for use in regenerating the regenerable filter comprising a pair of electrodes, elongated in the plane of the ACF filter sheet and spaced apart thereon at opposite terminal side edges of the ACF filter sheet, that together with a power supply provide an electrical current through the ACF filter sheet.

2. A regenerable air cleaning device according to claim 1, wherein the filter holder and filter are integral.

3. A regenerable air cleaning device according to claim 1, that further comprises:
    a housing having an air inlet port and an air outlet port in communication to provide a passage for air to pass through the housing, the filter being situated in the passage; and
    a fan situated in the passage to draw air through the housing;
    whereby, in operation, the filter removes contaminants from air drawn through the housing.

4. A regenerable air cleaning device according to claim 3, that further comprises a control panel that includes at least one indicator that relates to a user a status of at least one control system function.

5. A regenerable air cleaning device according to claim 4, wherein the device is portable.

6. A regenerable air cleaning device according to claim 3, wherein the control system uses time of exposure of the filter to contaminants for determining when to regenerate the filter.

7. A regenerable air cleaning device according to claim 6, wherein time of exposure is measured by a cumulative solid state run timer.

8. A regenerable air cleaning device according to claim 3, wherein control of a time required to regenerate the ACF filter sheet is provided by a solid state regeneration timer.

9. A regenerable air cleaning device according to claim 3, wherein the filter holder is a frame.

10. A regenerable air cleaning device according to claim 3, further comprising:
    a fan speed controller operatively connected to the fan; and
    a gas sensor operatively connected to the fan speed controller;
    whereby fan speed adjusts automatically in response to contaminant concentration as detected by the gas sensor.

11. A regenerable air cleaning device according to claim 3, wherein the control system comprises:
    a gas sensor before the filter holder and a gas sensor after the filter holder;
    the gas sensors being operatively connected to a filter efficiency monitor for determining when to regenerate the filter.

12. A regenerable air cleaning device according to claim 1, wherein the ACF filter sheet is pleated and where the pleats are parallel to the electrodes.

13. A regenerable air cleaning device according to claim 4, wherein the indicator provides an indication to a user that a pre-set time has elapsed and that regeneration of the air cleaner is required.

14. A regenerable air cleaning device according to claim 3, wherein the housing has a particulate filter occluding the air inlet port.

15. A regenerable air cleaning device according to claim 3, wherein a power supply for the fan is a 12 volt lighter socket supply.

16. A regenerable air cleaning device according to claim 1, wherein the power supply is a 120 volt AC supply.

17. A method of cleaning air in a confined space, comprising operating the regenerable air cleaning device defined in claim 1 or 3 in the confined space.

18. A method according to claim 17, wherein the confined space is a passenger compartment of a motor vehicle.

19. A method of cleaning air in a confined space, comprising operating the regenerable air cleaning device defined in claim 3 the confined space.

20. A method according to claim 19, wherein the confined space is a passenger compartment of a motor vehicle.

21. A regenerable air cleaning device comprising:
    a filter holder supporting a regenerable filter that includes activated carbon fibers (ACF);
    a control system that is adapted to determine when to regenerate the regenerable filter; and
    a heat source is provided for use in regenerating the regenerable filter, wherein the heat source comprises a radiant heat source spaced apart from the ACF sheet comprising the vehicle engine cooling system.

22. A regenerable air cleaning device according to claim 21, wherein the filter holder and filter are integral and non-demountable.

23. A regenerable air cleaning device according to claim 21, wherein the activated carbon fibers are in the form of a sheet.

24. A regenerable air cleaning device according to claim 21, that further comprises:
    a housing having an air inlet port and an air outlet port in communication to provide a passage for air to pass through the housing, the filter being situated in the passage; and
    a fan situated in the passage to draw air through the housing; whereby, in operation, the filter removes contaminants from air drawn through the housing.

25. A regenerable air cleaning device according to claim 24, that further comprises a control panel that includes at least one indicator that relates to a user a status of at least one control system function.

26. A regenerable air cleaning device according to claim 25, wherein the device is portable.

27. A regenerable air cleaning device according to claim 24, wherein the control system uses time of exposure of the filter to contaminants for determining when to regenerate the filter.

28. A regenerable air cleaning device according to claim 27, herein time of exposure is measured by a cumulative solid state run timer.

29. A regenerable air cleaning device according to claim 24, wherein control of a time required to regenerate the ACF sheet is provided by a solid state regeneration timer.

30. A regenerable air cleaning device according to claim 24, wherein the filter holder is a frame.

31. A regenerable air cleaning device according to claim 21, wherein the heat source is in a separate regeneration unit that is adapted to receive the cartridge.

32. A regenerable air cleaning device according to claim 24, further comprising:
- a fan speed controller operatively connected to the fan; and
- a gas sensor operatively connected to the fan speed controller; whereby fan speed adjusts automatically in response to contaminant concentration as detected by the gas sensor.

33. A regenerable air cleaning device according to claim 24, wherein the control system comprises:
- a gas sensor before the filter holder and a gas sensor after the filter holder;
- the gas sensors being operatively connected to a filter efficiency monitor for determining when to regenerate the filter.

34. A regenerable air cleaning device comprising:
- a filter holder supporting a regenerable filter that includes activated carbon fibers (ACF);
- a control system that is adapted to determine when to regenerate the regenerable filter; and
- a heat source is provided for use in regenerating the regenerable filter;
- wherein the filter holder and filter are demountable so that the filter can be removed for regeneration by a heat source and then remounted; and
- wherein the filter holder is a removable cartridge comprising a frame supporting an ACF sheet, the cartridge being adapted for insertion into a complementary slot in the housing.

35. A regenerable air cleaning device according to claim 34 wherein the activated carbon fibers are in the form of a sheet.

36. A regenerable air cleaning device according to claim 34, that further comprises:
- a housing having an air inlet port and an air outlet port in communication to provide a passage for air to pass through the housing, the filter being situated in the passage; and
- a fan situated in the passage to draw air through the housing;
- whereby, in operation, the filter removes contaminants from air drawn through the housing.

37. A regenerable air cleaning device according to claim 36, that further comprises a control panel that includes at least one indicator that relates to a user a status of at least one control system function.

38. A regenerable air cleaning device according to claim 37, wherein the device is portable.

39. A regenerable air cleaning device according to claim 36, wherein the control system uses time of exposure of the filter to contaminants for determining when to regenerate the filter.

40. A regenerable air cleaning device according to claim 37, wherein time of exposure is measured by a cumulative solid state run timer.

41. A regenerable air cleaning device according to claim 36, wherein control of a time required to regenerate the ACF sheet is provided by a solid state regeneration timer.

* * * * *

UNITED STATES PATENT AND TRADEMARK OFFICE
CERTIFICATE OF CORRECTION

PATENT NO. : 6,454,834 B1  
DATED : September 24, 2002  
INVENTOR(S) : Livingstone, David E.

It is certified that error appears in the above-identified patent and that said Letters Patent is hereby corrected as shown below:

Title page,
Item [56], FOREIGN PATENT DOCUMENTS, delete "055184838" and insert in place thereof -- 05184838 --.

Column 12,
Line 63, delete "Comaparison" and insert in place thereof -- Comparison --.

Signed and Sealed this

Fifth Day of August, 2003

JAMES E. ROGAN
*Director of the United States Patent and Trademark Office*